United States Patent
De Martin

(10) Patent No.: US 9,604,326 B2
(45) Date of Patent: Mar. 28, 2017

(54) AUTONOMOUS DEVICE EMPLOYED IN A SYSTEM FOR FACILITATING THE ASSEMBLY OF A PRODUCT

(71) Applicant: Schneider Electric Industries SAS, Rueil Malmaison (FR)

(72) Inventor: Lino De Martin, Croisy sur Andelle (FR)

(73) Assignee: SCHNEIDER ELECTRIC INDUSTRIES SAS, Rueil Malmaison (FR)

(*) Notice: Subject to any disclaimer, the term of this patent is extended or adjusted under 35 U.S.C. 154(b) by 734 days.

(21) Appl. No.: 13/920,527

(22) Filed: Jun. 18, 2013

(65) Prior Publication Data

US 2014/0007419 A1    Jan. 9, 2014

(30) Foreign Application Priority Data

Jul. 5, 2012 (FR) .................................. 12 56446

(51) Int. Cl.
*B23P 19/00* (2006.01)
*G05B 19/418* (2006.01)

(52) U.S. Cl.
CPC ........ *B23P 19/00* (2013.01); *G05B 19/41805* (2013.01); *G05B 2219/31027* (2013.01);
(Continued)

(58) Field of Classification Search
None
See application file for complete search history.

(56) References Cited

U.S. PATENT DOCUMENTS 5,414,634 A * 5/1995 Morgan ............... B65G 1/1375
209/702
5,781,443 A * 7/1998 Street ............... G05B 19/41805
414/273

(Continued)

FOREIGN PATENT DOCUMENTS

DE    20 2011 106 404 U1    11/2011
JP    2007-148995    6/2007

OTHER PUBLICATIONS

French Preliminary Search Report issued Apr. 22, 2013, in French Application No. 12 56446 filed Jul. 5, 2012 (with Written Opinion and English Translation of Categories of Cited Documents).

*Primary Examiner* — Christopher E Everett
(74) *Attorney, Agent, or Firm* — Oblon, McClelland, Maier & Neustadt, L.L.P.

(57) ABSTRACT

The invention relates to a device (D2) employed in a system for facilitating the assembly of a product, said assembly being carried out by following one or more assembly sequences, an assembly sequence comprising several successive assembly steps graded by execution ranks, said device comprising:
- a presence sensor (C2),
- at least one signalling member (V2),
- a sequencer (SQ2) connected to the presence sensor (C2) and to the signalling member (V2), said sequencer comprising a microcontroller designed to manage said assembly sequence.

The invention also relates to a system for facilitating the assembly of a product comprising several devices (D2) connected together via a communication line.

15 Claims, 2 Drawing Sheets

(52) U.S. Cl.
CPC ..... *G05B 2219/31046* (2013.01); *Y02P 90/04* (2015.11); *Y02P 90/14* (2015.11); *Y02P 90/20* (2015.11); *Y02P 90/265* (2015.11); *Y10T 29/53039* (2015.01)

(56) References Cited

U.S. PATENT DOCUMENTS

| | | | |
|---|---|---|---|
| 6,381,509 B1* | 4/2002 | Thiel | G06Q 10/06 382/282 |
| 2002/0070846 A1* | 6/2002 | Bastian, II | G06F 3/147 340/5.92 |
| 2005/0113949 A1 | 5/2005 | Honda | |
| 2012/0062725 A1* | 3/2012 | Wampler, II | G01V 8/12 348/86 |
| 2012/0323394 A1* | 12/2012 | Gandhi | H05B 33/0857 700/297 |

\* cited by examiner

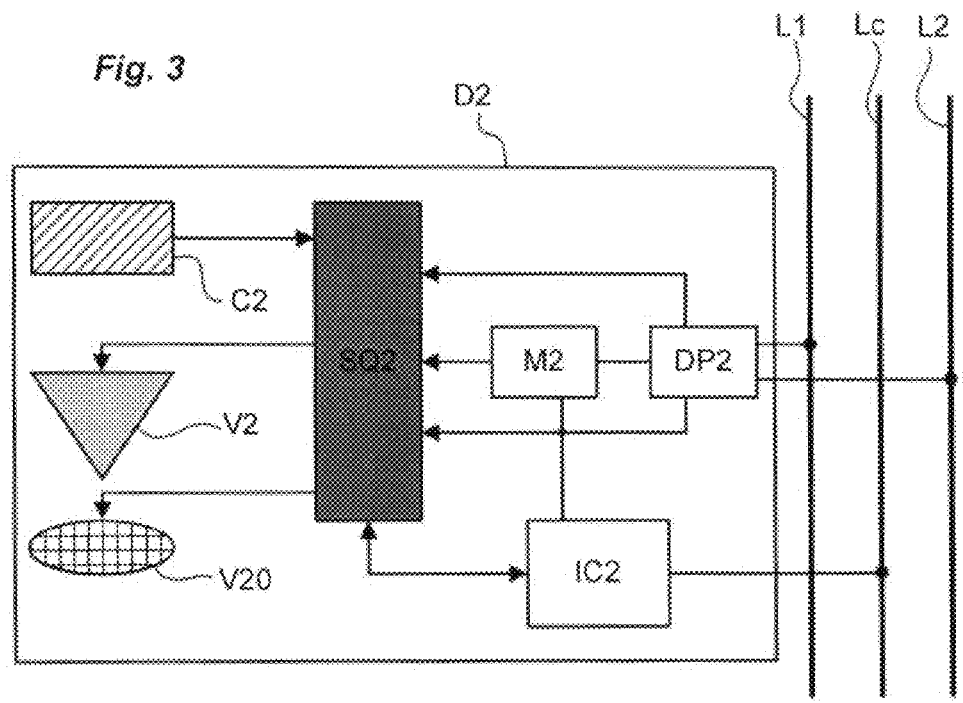
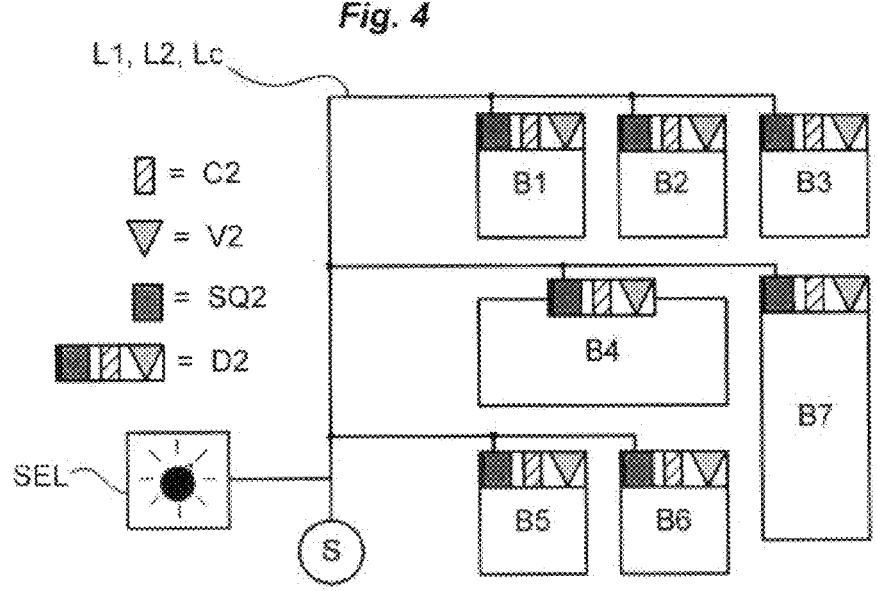

AUTONOMOUS DEVICE EMPLOYED IN A SYSTEM FOR FACILITATING THE ASSEMBLY OF A PRODUCT

TECHNICAL FIELD OF THE INVENTION

The present invention pertains to an autonomous device employed in a system for facilitating the assembly of a product. The invention also relates to the system for facilitating the assembly of a product comprising several devices in accordance with the invention.

PRIOR ART

Systems exist which make it possible to assist an operator to assemble a product in a manufacturing process. These systems are designed to signal to the operator the next part to be picked up in the product assembly process. These systems comprise signalling members placed in proximity to each storage bin for signalling to the operator in which storage bin the next part to be assembled is situated, presence sensors positioned on each storage bin, and a sequencer for conducting the product assembly sequence. The sequencer is designed to dispatch a first control signal to a signalling member placed in proximity to the storage bin from which the first part has to be picked up. It thereafter receives a detection signal originating from the presence sensor positioned on this storage bin, indicating that the operator has picked up the part, and then passes to the next assembly step by dispatching a second control signal to a signalling member associated with the storage bin from which the next part has to be picked up. The sequencer conducts a stored assembly sequence until the product is fully assembled. For each parts storage bin, a signalling member and a presence sensor are employed. These are all linked up to the sequencer which centralizes their control by following the assembly sequence. Such solutions are described in the documents DE202011106404U1, JP2007148995A or US2005/113949A1.

These known arrangements present certain drawbacks, among which:
- The necessity of an infrastructure that is unwieldy in terms of wiring or dimensioning of the apparatuses employed, even if the product to be assembled comprises few parts.
- The lack of flexibility in case of change of manufacturing process. The entire wiring must then be redone and the sequence must be reprogrammed in full.

The aim of the invention is to propose a device employed in a system for facilitating the assembly of a product, which is reliable, which requires only limited wiring and which is easy to programme to allow fast adaptation to any new manufacturing process.

DISCLOSURE OF THE INVENTION

This aim is achieved by a device employed in a system for facilitating the assembly of a product, said assembly being carried out by following at least one assembly sequence, said assembly sequence comprising several successive assembly steps graded by execution ranks, said device comprising:
- a presence sensor,
- at least one signalling member,
- a sequencer connected to the presence sensor and to the signalling member, said sequencer comprising a microcontroller designed to manage said assembly sequence,
- a communication interface designed to exchange messages on a communication line, the sequencer comprising:
- a module for storing and marking a rank of an assembly step of the assembly sequence,
- a control module designed to dispatch a control signal to the signalling member when the marked rank is reached,
- a reception module designed to receive a detection signal originating from the presence sensor,
- an emission module designed to dispatch a message on the communication line, representative of the end of the assembly step corresponding to the marked rank.

According to a particular feature, the device comprises a casing housing the presence sensor, said at least one signalling member, the communication interface and the sequencer.

According to another particular feature, the device comprises means for detecting passage to a learning phase. The detection means comprise for example a polarity detector connected to the sequencer. The polarity detector is for example housed in the casing.

According to another particular feature, the device comprises an electrical power supply module. The electrical power supply module is for example housed in the casing.

According to another particular feature, the sequencer comprises a microcontroller.

According to another particular feature, the device comprises a second signalling member able to signal pick-up errors.

According to another particular feature, the second signalling member is housed in the casing.

The invention relates to a system for facilitating the assembly of a product, said system comprising:
- a first device and at least one second device, each in accordance with that defined hereinabove,
- a communication line,
- the first device being connected to the second device via the communication line,
- the marking module for the first device being designed to mark a first rank of a first assembly step of the assembly sequence and the marking module for the second device being designed to mark a second rank of a second assembly step of the assembly sequence.

According to a particular feature, the system comprises a power supply source and two power supply lines connected to said power supply source, the first device and the second device being connected to the two power supply lines.

According to another particular feature, the communication line is embodied on a power supply line.

According to another particular feature, the system comprises a selector making it possible to select an assembly sequence from among several assembly sequences stored in the first device and the second device.

According to another particular feature, the system comprises a second signalling member able to signal pick-up errors, this second signalling member being connected to the communication line.

BRIEF DESCRIPTION OF THE FIGURES

Other characteristics and advantages will become apparent in the detailed description which follows, in conjunction with the appended drawings in which:

FIG. 3 represents in a schematic manner the autonomous device employed in the system of the invention, FIG. 4 illustrates an enhancement of the system of the invention.

DETAILED DESCRIPTION OF AT LEAST ONE EMBODIMENT

In the subsequent description, the various modules described hereinbelow can be achieved through software means, through electronic means or through the combination of software and electronic means.

The invention relates to a system for facilitating the assembly of a product. On product manual-assembly lines, an operator is required to pick up parts and/or to execute tasks intended for the assembly of the product. To assist him in his task, systems for facilitating product assembly have been introduced. Such a system conducts the assembly sequence and indicates, at each assembly step, the part which the operator has to pick up or the task to be executed. In the subsequent description, we take the example of the assembly of a product with the help of various parts distributed in seven separate storage bins B1-B7.

Figure 1:
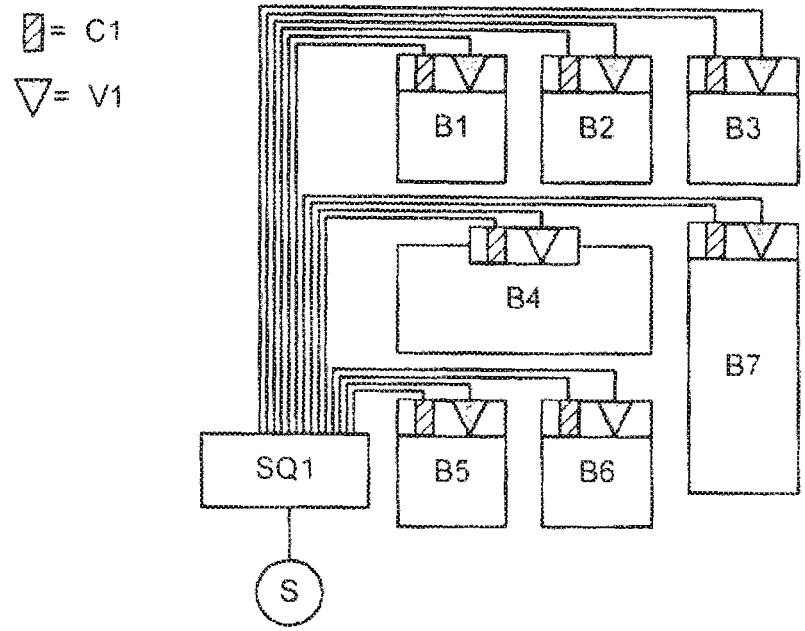
FIG. 1 represents a system for facilitating the assembly of a product, such as it is known in the prior art.

Accordingly, as represented in FIG. 1, a system known in the prior art comprises:
  a sequencer SQ1 responsible for conducting the assembly sequence,
  for each parts storage bin (B1-B7), a unit formed of a signalling member V1 and of a presence sensor C1.

During an assembly step for the product, the sequencer dispatches an order to the signalling member V1 situated in proximity to the storage bin where the part to be assembled is stored. When the part is picked up from said storage bin, the presence sensor C1 detects the presence of the operator's hand and dispatches a detection signal to the sequencer SQ1 which can then pass to the next step.

As already described hereinabove, such a system presents certain drawbacks.

To alleviate these drawbacks, the invention consists in dispensing with the centralized sequencer SQ1 and in decentralizing the management of the assembly sequence in several autonomous devices.

Figure 2:
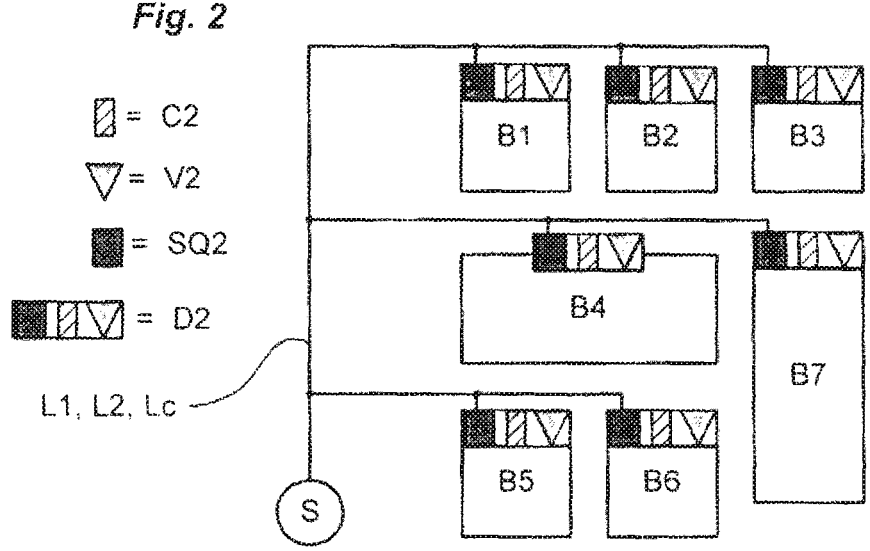
FIG. 2 represents a system for facilitating the assembly of a product in accordance with the invention.

With reference to FIG. 2, the system thus comprises several identical devices D2, each connected to a communication line Lc so as to be able to communicate with one another and to two power supply lines L1, L2 linked to a power supply source S. The power supply source S is able to deliver a continuous power supply voltage to the devices. In a variant embodiment, the communication line Lc could be embodied on a power supply line, the electrical signal of the power supply line being modulated to pass data thereon.

In the subsequent description and in the appended figures, we take the example of a system comprising two power supply lines L1, L2, one at an electrical potential of 0 Vdc and the other at an electrical potential lying between 10 and 30 Vdc, and a communication line separate from the two power supply lines.

The system furthermore comprises a device for controlling the power supply source. This device makes it possible to switch the power supply source on and off and can also make it possible to reverse the polarity of the voltage provided.

As represented in FIG. 2, the devices D2 are thus connected in parallel with respect to the power supply lines L1, L2 and to the communication line Lc. Each device D2 comprises for example at least one connector that connects up to a complementary connector linked to the power supply lines and to the communication line.

Each device D2 is for example associated with a separate parts storage bin (B1-B7). In FIG. 2, the system thus comprises seven devices D2 connected in parallel, each of these devices being positioned in proximity to a different parts storage bin.

With reference to FIG. 3, each device D2 of the system for facilitating the assembly of a product comprises mainly:
  a presence sensor C2,
  a signalling member V2,
  a sequencer SQ2,
  a communication interface IC2.

According to the invention, the presence sensor C2 makes it possible to detect the presence of the operator, for example his hand, when picking up the part from the storage bin. It can be of various types, for example optical, inductive or ultrasonic. Any other technology making it possible to detect the presence of the operator could be employed.

The signalling member V2 makes it possible to signal to the operator the storage bin from which he has to pick up the part so as to comply with the assembly sequence. The signalling member V2 can be luminous, embodied in the form of a light indicator.

The sequencer SQ2 comprises a microcontroller designed to conduct the product assembly sequence. In a known manner, a microcontroller comprises at least one processor and a nonvolatile memory. The sequencer comprises in particular a module for controlling the signalling member V2, making it possible to activate or to deactivate the signalling member V2, and a reception module designed to receive a detection signal originating from the presence sensor C2. The nonvolatile memory of a device is organized as arrays of bits, an array of bits representing a product assembly sequence. Each bit corresponds to a rank in the assembly sequence. A device can store several different assembly sequences, each modelled by an array of bits.

The communication interface IC2 is designed to allow the device to exchange messages on the communication line Lc. This communication interface comprises for example an input whose state is monitored by the sequencer SQ2 when reading the data travelling on the communication line Lc and a transistor controlled by the sequencer SQ2 when writing data on the communication line Lc.

Preferably, the presence sensor C2, the signalling member V2, the sequencer SQ2 and the communication interface IC2 are housed in one and the same casing forming a monolithic unit. Of course, other configurations could be envisaged. It would thus be possible to arrange the various elements in several casings connected together.

Preferably, the device D2 can also comprise a second signalling member V20 making it possible to signal a pick-up error to the operator. This second signalling member V20 is for example of audible type. This second signalling member is for example housed in the casing of the device. As a variant embodiment (not represented), this second signalling member is common to all the devices D2 and connected in parallel with the devices on the communication line. In this variant, in case of pick-up error, the device D2 having detected the error generates a control signal on the communication line Lc, activating the second signalling member V20.

Preferably, each device D2 comprises an electrical power supply module M2 making it possible to manage the power supply of the various components of the device, in particular of the sequencer SQ2. This power supply module is for example housed in the same casing as the other elements of the device D2.

The assembly sequence comprises several successive steps, to each of which it is possible to allocate an execution rank. Contrary to the prior art, the assembly sequence is not managed by a single centralized sequencer (SQ1 in FIG. 1) but it is followed by each sequencer SQ2 situated in each device D2. For each assembly step which relates to it, the sequencer SQ2 of a device activates a module for marking the rank corresponding to the assembly step. Of course, if one and the same part is used in several of the product's assembly steps, the sequencer of the device associated with the bin for storing this part marks the rank of each of these assembly steps. The sequencer is therefore adapted for managing one or more of the product's assembly steps but not all of its assembly steps. It marks only each rank for which the part from its storage bin has to be employed. In order to be able to follow the assembly sequence, the sequencer SQ2 also stores the ranks of the other assembly steps, without marking them.

For example, the marking of a rank of the assembly sequence is carried out by assigning it a 1, a rank remaining at the value 0 if it is not marked. Any other solution could of course be envisaged.

Advantageously, the assembly sequence is learned by the devices during a learning phase. As a variant embodiment, the assembly sequence could also be loaded into each device via the communication line by employing an external device.

Preferably, each device D2 comprises means for detecting passage to a learning phase.

The detection means comprise for example a polarity detector DP2 making it possible to detect the polarity between the two power supply lines L1, L2. Preferably, this polarity detector DP2 is housed in the casing of the device D2. It is composed for example of a diode bridge connected on the one hand to the two power supply lines L1, L2 and on the other hand to the sequencer SQ2, via the power supply module. Passage to the learning phase is for example carried out by supplying the system with a negative voltage detected by each device by virtue of its polarity detector DP2.

According to the invention, the learning phase is thus conducted in the following manner:

With the help of the device for controlling the power supply source S, the operator supplies the system with a negative polarity DC voltage.

By way of the polarity detector DP2, the sequencer SQ2 of each device D2 detects the reversal of polarity and then activates a learning module.

In each device, the learning module temporarily activates the module for controlling the signalling member V2 to close, so as to indicate to the operator that the learning phase can start.

The operator then picks up the first part from a storage bin B1-B7. In the device relevant to this storage bin, the presence sensor C2 detects the operator's hand and dispatches a detection signal to the sequencer SQ2. On receipt of this signal, the sequencer SQ2 temporarily activates the module for controlling the signalling member V2 to close, so as to indicate to the operator that the pick-up has indeed been taken into account.

The sequencer SQ2 activates the module for marking the rank of this assembly step in the assembly sequence.

By way of the communication interface, the sequencer SQ2 dispatches a message on the communication line to the other devices D2 of the system with a view to indicating to them that they are not relevant to this assembly step.

On receipt of the message, the sequencers SQ2 of the other devices of the system activate their module for storing the rank of the assembly step, without marking it.

For the second assembly step and all the subsequent steps up until the end of the assembly of the product, the operation of the learning is identical to that described hereinabove. Of course, the operator can pick up one and the same part several times. The relevant device D2 then marks several ranks in the stored assembly sequence.

At the end of the learning phase, each device D2 stores in its memory all the ranks of the assembly sequence, one or more ranks being marked depending on whether the device is or is not relevant to the assembly step. During the learning phase, at each new pick-up, the sequencers SQ2 of the devices increment for example a counter of the number of parts to be assembled. The end of the learning phase is for example achieved by shutting off the power supply.

Once the learning phase is completed, the reading of the assembly sequence can take place. The latter is conducted in the following manner:

With the help of the device for controlling the power supply source S, the operator supplies the system with a positive voltage.

By way of the polarity detector DP2, the sequencer SQ2 of each device D2 detects this polarity and then activates a module for reading its nonvolatile memory. The sequencer SQ2, of which rank 1 of the assembly sequence is marked, then activates the module for controlling the signalling member V2 with a view to indicating to the operator the storage bin in which the first part to be picked up is situated.

The other devices D2, not relevant to the first assembly step, permanently read the communication line Lc so as to detect the passage to the next assembly step.

The operator picks up the first part from the storage bin corresponding to the signalling member V2 that is lit up. The presence sensor C2 detects part seizure from the storage bin and dispatches a detection signal to the sequencer SQ2.

On receipt of the detection signal, the sequencer SQ2 deactivates the module for controlling the signalling member V2. Thereafter, by way of the communication interface IC2, the sequencer dispatches a message on the communication line Lc in order to warn the other devices D2 that the assembly step of rank 1 is finished.

On reading the message, the sequencers SQ2 of the devices then activate their module for reading their memory. The device of which rank 2 is marked then becomes active.

The process described hereinabove is conducted in this way up until the last assembly step. With each pick-up of a part, the devices decrement their counter. When it is at zero, the assembly sequence is completed. Advantageously, at the end of the assembly sequence, all the devices D2 activate their module for controlling the signalling member V2 with a view to indicating the end of the assembly sequence to the operator and initialize themselves so as to replay the assembly sequence. The counter is reset to the value learned on completion of the learning phase.

As represented in FIG. 4, the system of the invention can advantageously comprise a selector SEL making it possible to select an assembly sequence from among several assembly sequences stored in the devices. This selector SEL is connected to the communication line Lc. The selector SEL comprises for example a coder wheel, a rotary button or a unit formed of a button and of a display. It could also comprise a barcode reader or an RFID reader. The selector SEL generates a code representative of the index number of the assembly sequence to be started and dispatches it on the communication line Lc to the devices D2. During the learning phase, a phase prior to the storage of the assembly sequence consists in storing the index number of the sequence which will be learned. Each device D2 can store several assembly sequences in its nonvolatile memory. This particular feature makes it possible to offer the operator great flexibility, he then being able to pass easily to the assembly of another product, just by selecting the index number of the assembly sequence allocated to this product.

According to the invention, the second centralized signalling member V20 which makes it possible to signal a pick-up error is for example housed in one and the same casing as the selector SEL. A device for detecting the start and/or the end of the assembly sequence and/or the device for controlling the power supply source can also be housed in this casing. Other centralized functionalities could also be added thereto.

The invention described therefore presents numerous advantages. It offers the operator great flexibility and also offers ease of implementation. There is no need for the operator to be particularly qualified in order to generate an assembly sequence. Moreover, the system adapts automatically to the number of devices employed and if a device develops a fault, it is very easy to replace it.

The invention claimed is:

1. A device employed in a system for facilitating assembly of a product, the assembly being carried out by following at least one assembly sequence, an assembly sequence comprising several successive assembly steps graded by execution ranks, the device being associated with a single parts storage bin employed for one or more assembly steps for the product, the device comprising:
a presence sensor;
at least one signalling member;
a sequencer connected to the presence sensor and to the signalling member, the sequencer comprising a microcontroller configured to manage the assembly sequence;
a communication interface configured to exchange messages on a communication line; and
a detector configured to detect passage to a learning phase, wherein
the sequencer is configured to manage one or more of the assembly steps associated with the sequencer, without managing other assembly steps that are not associated with the sequencer, by storing and marking a rank of an assembly step associated with the sequencer,
the sequencer is configured to dispatch a control signal to the signalling member when the marked rank is reached,
the sequencer is configured to receive a detection signal originating from the presence sensor,
the sequencer is configured to dispatch a message on the communication line, representative of an end of the assembly step corresponding to the marked rank, and
the sequencer is configured to dispatch, during the learning phase, a message on the communication line to an other device of the system indicating that the other device is not relevant to the one or more assembly steps associated with the sequencer.

2. The device according to claim 1, further comprising a casing housing the presence sensor, the at least one signalling member, the sequencer, and the communication interface.

3. The device according to claim 2, further comprising an electrical power supply module.

4. The device according to claim 3, wherein the electrical power supply module is housed in the casing.

5. The device according to claim 2, further comprising a second signalling member configured to signal pick-up errors.

6. The device according to claim 5, wherein the second signalling member is housed in the casing.

7. The device according to claim 1, wherein the detector is a polarity detector connected to the sequencer.

8. The device according to claim 7, wherein the polarity detector is housed in a casing.

9. The device according to claim 1, further comprising a device configured to end the learning phase by shutting off a power supply.

10. A system for facilitating assembly of a product, the system comprising:
a communication line; and
a first device and at least one second device, each device being associated with a single parts storage bin employed for one or more assembly steps for the product, each device including
a presence sensor,
at least one signalling member,
a sequencer connected to the presence sensor and to the signalling member, the sequencer comprising a microcontroller configured to manage the assembly sequence, and
a communication interface configured to exchange messages on the communication, wherein
the sequencer is configured to manage one or more of the assembly steps associated with the sequencer, without managing other assembly steps that are not associated with the sequencer, by storing and marking a rank of an assembly step associated with the sequencer,
the sequencer is configured to dispatch a control signal to the signalling member when the marked rank is reached,
the sequencer is configured to receive a detection signal originating from the presence sensor, and
the sequencer is configured to dispatch a message on the communication line, representative of an end of the assembly step corresponding to the marked rank, wherein
the first device is connected to the second device via the communication line,
the sequencer of the first device is configured to mark a first rank of a first assembly step of the assembly sequence, and the sequencer of the second device is configured to mark a second rank of a second assembly step of the assembly sequence,
the first device includes a detector configured to detect passage to a learning phase, and
the sequencer of the first device is configured to dispatch, during the learning phase, a message on the communication line to the second device indicating that the second device is not relevant to the one or more assembly steps associated with the sequencer of the first device.

11. The system according to claim 10, further comprising:
a power supply source; and two power supply lines connected to the power supply source, the first device and the second device being connected to the two power supply lines.

12. The system according to claim 10, wherein the communication line is embodied on a power supply line.

13. The system according to claim 10, further comprising a selector configured to select an assembly sequence from among several assembly sequences stored in the first device and the second device.

14. The system according to claim 10, further comprising a second signalling member configured to signal pick-up errors, the second signalling member being connected to the communication line.

15. The system according to claim 10, wherein, during the learning phase, the sequencer of the second device is configured to store a rank of the one or more assembly steps without ranking the one or more assembly steps.

* * * * *